US007796759B2

(12) United States Patent
Wuidart et al.

(10) Patent No.: US 7,796,759 B2
(45) Date of Patent: *Sep. 14, 2010

(54) DIVERSIFICATION OF A SINGLE INTEGRATED CIRCUIT IDENTIFIER

(75) Inventors: Luc Wuidart, Pourrieres (FR); Michel Bardouillet, Rousset (FR); Laurent Plaza, Fuveau (FR)

(73) Assignee: STMicroelectronics S.A., Montrouge (FR)

( * ) Notice: Subject to any disclaimer, the term of this patent is extended or adjusted under 35 U.S.C. 154(b) by 1150 days.

This patent is subject to a terminal disclaimer.

(21) Appl. No.: 10/268,628

(22) Filed: Oct. 10, 2002

(65) Prior Publication Data

US 2003/0103628 A1    Jun. 5, 2003

(30) Foreign Application Priority Data

Nov. 30, 2001    (FR) .................................. 01 15531

(51) Int. Cl.
*H04L 9/00* (2006.01)

(52) U.S. Cl. ...................... 380/265; 380/262; 380/264; 713/189; 713/194

(58) Field of Classification Search ........................ None
See application file for complete search history.

(56) References Cited

U.S. PATENT DOCUMENTS

| 4,529,870 A | 7/1985 | Chaum |
| 4,663,500 A | 5/1987 | Okamoto et al. |
| 4,783,801 A | 11/1988 | Kaule |
| 4,862,501 A | 8/1989 | Kamitake et al. |
| 5,036,461 A | 7/1991 | Elliott et al. |
| 5,227,613 A | 7/1993 | Takagi et al. |
| 5,363,448 A | 11/1994 | Koopman et al. |
| 5,436,971 A | 7/1995 | Armbrust et al. |
| 5,495,419 A * | 2/1996 | Rostoker et al. ............ 700/121 |
| 5,680,458 A | 10/1997 | Spelman et al. |
| 5,734,819 A * | 3/1998 | Lewis .......................... 726/29 |
| 5,818,738 A | 10/1998 | Effing |
| 5,841,866 A | 11/1998 | Bruwer et al. |
| 5,903,461 A * | 5/1999 | Rostoker et al. ............ 700/121 |
| 5,999,629 A | 12/1999 | Heer et al. |
| 6,073,236 A | 6/2000 | Kusakabe et al. |
| 6,097,814 A | 8/2000 | Mochizuki |

(Continued)

FOREIGN PATENT DOCUMENTS

DE    19843424 A1    3/2000

(Continued)

OTHER PUBLICATIONS

French Search Report from priority French patent application No. 0115531, filed Nov. 30, 2002.

(Continued)

*Primary Examiner*—Pramila Parthasarathy
(74) *Attorney, Agent, or Firm*—Lisa K. Jorgenson; William R. McClellan; Wolf, Greenfield & Sacks, P.C.

(57) ABSTRACT

A method and a circuit of generation of several secret quantities by an integrated circuit according to the destination of these secret quantities, including taking into account a first digital word forming a single identifier of the integrated circuit chip and coming from a physical parameter network, and of individualizing this identifier according to the application.

19 Claims, 2 Drawing Sheets

U.S. PATENT DOCUMENTS

| | | | |
|---|---|---|---|
| 6,161,213 | A | 12/2000 | Lofstrom |
| 6,209,098 | B1 | 3/2001 | Davis |
| 6,230,267 | B1 | 5/2001 | Richards et al. |
| 6,230,270 | B1 | 5/2001 | Laczko, Sr. |
| 6,253,223 | B1 | 6/2001 | Sprunk |
| 6,308,256 | B1 | 10/2001 | Folmsbee |
| 6,317,829 | B1 | 11/2001 | Van Oorschot |
| 6,408,388 | B1 | 6/2002 | Fischer |
| 6,438,718 | B1 * | 8/2002 | Cline .................. 714/718 |
| 6,641,050 | B2 * | 11/2003 | Kelley et al. ............ 235/492 |
| 6,650,753 | B1 | 11/2003 | Lotspiech et al. |
| 6,651,170 | B1 | 11/2003 | Rix |
| 6,704,872 | B1 | 3/2004 | Okada |
| 6,715,078 | B1 | 3/2004 | Chasko et al. |
| 6,795,837 | B1 | 9/2004 | Wells |
| 6,845,450 | B1 | 1/2005 | Kobayashi et al. |
| 7,016,924 | B2 | 3/2006 | Nakabe et al. |
| 2001/0055132 | A1 | 12/2001 | Oshima et al. |
| 2003/0102493 | A1 | 6/2003 | Wuidart et al. |
| 2003/0103629 | A1 | 6/2003 | Wuidart et al. |
| 2004/0199736 | A1 * | 10/2004 | Kamano et al. ............ 711/163 |
| 2005/0021990 | A1 | 1/2005 | Liardet et al. |
| 2005/0188218 | A1 * | 8/2005 | Walmsley et al. ........... 713/200 |

FOREIGN PATENT DOCUMENTS

EP         998073 A2      5/2000

OTHER PUBLICATIONS

French Search Report from related French patent application No. 0115526, filed Nov. 30, 2001.

French Search Report from related French patent application No. 0115529, filed Nov. 30, 2001.

Menezes et al., *Handbook of Applied Cryptography*, Handbook of Applied Cryptography, CRC Press Series on Discrete Mathematics and Its Applications, 1997 pp. 39-41, 203-208, 568 XP002217340.

Schneier, B., *Applied Cryptography*, Applied Cryptography. Protocols Algorithms, and Source Code in C, 1996, pp. 381-384 XP002217341.

Lofstrom, K, et al., *IC Identification Circuit Using Device Mismatch*, Solid-State Circuits Conference, 2000, Digest of Technical papers, ISSCC, 2000, IEEE International, 2000, pp. 372-373, Meeting date Feb. 7, 2000-Feb. 9, 2000, San Francisco, CA.

* cited by examiner

DIVERSIFICATION OF A SINGLE INTEGRATED CIRCUIT IDENTIFIER

BACKGROUND OF THE INVENTION

1. Field of the Invention

The present invention relates to the use of a secret quantity coming from an integrated circuit or from an electronic sub-assembly element containing such a circuit. For example, the present invention relates to the use of such a secret quantity by programs, as an encryption key, as a secret quantity of an integrated circuit identification or authentication process. The present invention more specifically relates to integrated circuits capable of executing several different application programs, be these programs contained in the integrated circuit or the electronic sub-assembly containing it or housed in distant systems.

2. Discussion of the Related Art

An example of application of the present invention relates to smart cards where the integrated circuit chip can be used for several purposes (for example, electronic payment, identification of the holder, etc.). In this case, it is desirable not to use the same secret quantity (digital datum) (of integrated circuit authentication or data encryption) for all the application programs likely to use this chip. Indeed, if a pirate attempts to executes a fraudulent application program from the integrated circuit chip, the secret quantity of the chip is also used. The distant system executing the fraudulent application can recover the secret quantity or key of the chip. This quantity can then be fraudulently used for other applications.

To avoid this type of fraud, conventional systems using smart cards in which the transmission with the exploitation terminal can be performed with or without contact, provide that the secret quantity of the chip is not read by the application program but is generated on request of the application program by the smart card operating system (for example, an operating system known under trade name JAVACard).

These conventional solutions require significant resources in terms of programming to execute the authentication or encryption process.

The present invention more specifically relates to the generation of distinct secret quantities according to the applications.

Among means for generating a secret quantity within an integrated circuit, the solutions using storage elements and those causing a generation of a binary word based on a physical parameter network linked to the integrated circuit manufacturing are essentially distinguished.

It could be thought to multiply the number of physical parameter networks so that they correspond to the number of applications that the integrated circuit can process. However, such a solution requires much more space and comprises a non-negligible risk of obtaining identical secret quantities generated by the physical parameter network.

Further, each application may require a minimum size of the secret quantity greater than the size of the quantity directly provided by the physical parameter network.

SUMMARY OF THE INVENTION

The present invention aims at overcoming the disadvantages of known solutions requiring an individualization of secret quantities according to the application programs involving an integrated circuit chip.

The present invention more specifically aims at providing a solution which is compatible with the use of a physical parameter network for the generation of the secret quantity.

The present invention also aims at providing a solution which is compatible with conventional methods of exploitation of secret quantities in authentication or encryption applications. In particular, it aims at remaining compatible with an authentication by the actual application programs, without requiring complex protocols of authentication by a central system.

The present invention further aims at providing a solution which is of small bulk on the integrated circuit chip.

To achieve these and other objects, the present invention provides a method of generation of several secret quantities by an integrated circuit according to the destination of these secret quantities, comprising taking into account a first digital word forming a single identifier of the integrated circuit chip and coming from a physical parameter network, and of individualizing this identifier according to the application.

According to an embodiment of the present invention, the first digital word is combined with a second word coming from a non-volatile memory containing several words.

According to an embodiment of the present invention, the word coming from the physical parameter network is used in a feedback shift register.

According to an embodiment of the present invention, several feedback shift registers are used.

According to an embodiment of the present invention, the shift register(s) are with a linear feedback.

The present invention also provides a cell for generating several secret quantities by means of a single identifier of an integrated circuit coming from a physical parameter network, including means for individualizing a first digital word coming from the physical parameter network based on a parameter which is a function of the desired quantity.

According to an embodiment of the present invention, the cell includes at least one feedback shift register, intended to be loaded with the first word coming from the physical parameter network, and to provide one of said secret quantities.

According to an embodiment of the present invention, the cell includes a combiner of the first word coming from the physical parameter network with a second digital word, extracted from a non-volatile memory and selected depending on a parameter chosen according to the desired quantity.

According to an embodiment of the present invention, the cell further includes a scrambler of the words contained in the non-volatile memory, based on the physical parameter network.

The foregoing objects, features and advantages of the present invention, will be discussed in detail in the following non-limiting description of specific embodiments in connection with the accompanying drawings.

DETAILED DESCRIPTION

Figure 1:
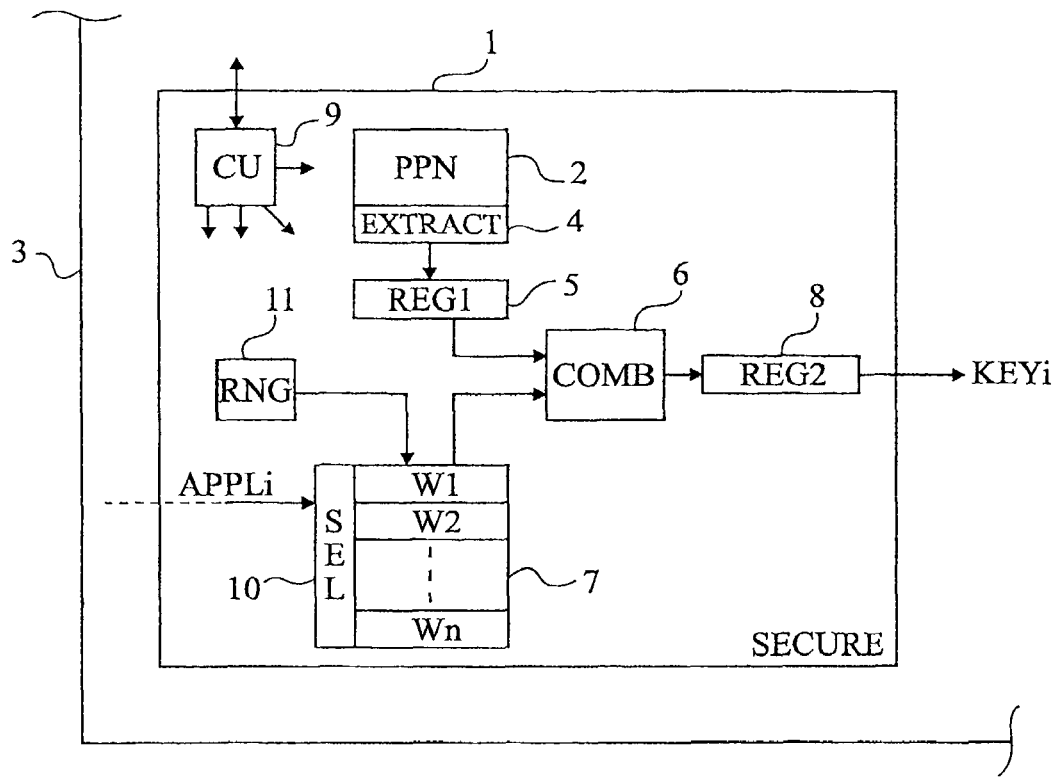
FIG. 1 shows in a very simplified view in the form of blocks, a first embodiment of a cell of generation of a secret quantity depending on the current application according to the present invention.

Same elements have been designated with same references in the different drawings. For clarity, only those elements of the integrated circuit that are necessary to the understanding of the present invention have been shown in the drawings and will be described hereafter. In particular, the application programs using the quantities (digital data) generated by the present invention have not been detailed.

A feature of the present invention is to generate a secret quantity taking into account an identifier based on a physical parameter network of the integrated circuit chip and the concerned application. In other words, the present invention provides individualizing the secret quantities provided according to the application requiring the secret quantity, always using as a basis a same physical parameter network.

FIG. 1 very schematically shows in the form of blocks a first embodiment of a cell 1 for generating a secret quantity, key or datum KEYi based on a physical parameter network 2 (PPN) and according to the application program (or to the application) requiring this quantity. The information relative to the application program is provided to cell 1 in the form of a digital parameter APPLi.

Cell 1 belongs to an integrated circuit 3 forming, for example, the chip of a smart card.

Physical parameter network 2 is associated with a circuit 4 (EXTRACT) for extracting signals coming from network 2 to generate a first digital word stored in a temporary storage element 5 (REG1) and forming a single identifier of the integrated circuit chip.

According to the first embodiment of the present invention illustrated in FIG. 1, the first digital word is combined in a combination circuit 6 (COMB) with a second digital word (W1, W2, . . . Wn) stored in a non-volatile memory 7 and depending on the application. An encryption key or any other secret quantity KEYi specific to cell 1, a word Wi intended to be combined with the single identifier of the integrated circuit chip, are assigned to each application likely to require a digital authentication word. The result of the combination is stored in a temporary storage element 8 (REG2).

The selection of the word for personalizing the quantity according to the application is performed by means of a selector 10 controlled by signal APPLi. If word table 7 corresponds to a space of a ROM or an EEPROM of the integrated circuit, the selector of course corresponds to the addressing circuit of this memory.

The generation (for storage) of words Wi associated with the different applications is performed in a personalization phase prior to the chip use. Words Wi may come from a generator 11 of random words, or from a preestablished table. The generation of an additional word Wi may further be provided upon addition of a new functionality, that is, at the time when the smart card is configured to operate with a new application. As an alternative, generator 11 is external to cell 1.

Cell 1 further includes a central unit 9 (CU) in charge of controlling and synchronizing the operation of all its components. In FIG. 1, the different connections of the central unit to the other elements have not been detailed. Unit 9 especially communicates with the rest of integrated circuit 3 for, at least, executing instructions corresponding to the request for provision of the secret quantity by cell 1.

An advantage of combining the identifier coming from the physical parameter network with a word depending on the application is that this optimally secures the exploitation of the secret quantities. In particular, if a pirate implements a fraudulent application and requests a secret quantity, the quantity that will be provided to him will not enable him to use this quantity, for example, to fraudulently identify on other application systems.

According to a simplified embodiment, number n of words to be stored in memory 7 is predefined upon manufacturing and the words are generated upon manufacturing or upon first use of the chip. After, for each new application requiring an authentication key, an encryption key or the like, a serial number is assigned in word table 7.

The physical parameter network may be formed by any conventional network. It may be, for example, a network of electric parameter measurement, in the form of a measurement of a threshold voltage of a transistor, a measurement of a resistance or a measurement of a stray capacitance, a measurement of the current generated by a current source, a measurement of a time constant (for example, an RC circuit), a measurement of an oscillation frequency, etc. Since these characteristics are sensitive to technological and manufacturing process dispersions of the integrated circuit, it can be considered that the electric parameter(s) taken into account are specific to the chip and form a signature thereof.

In the example of an electric parameter measurement, the signals are converted into digital signals by means of an analog-to-digital converter included in extractor 4 and may be multiplexed to form the first binary word stored in register 5.

As a physical parameter network, circuits using a time measurement may also be used. For example, the read/write time of an EEPROM-type memory is measured. An example of a physical parameter network of this type is described in U.S. Pat. No. 5,818,738, which is incorporated herein by reference.

A physical parameter network based on flip-flops such as described in French patent application no. 0,104,585 of the applicant may further be used, which application is herein incorporated by reference.

Figure 2:
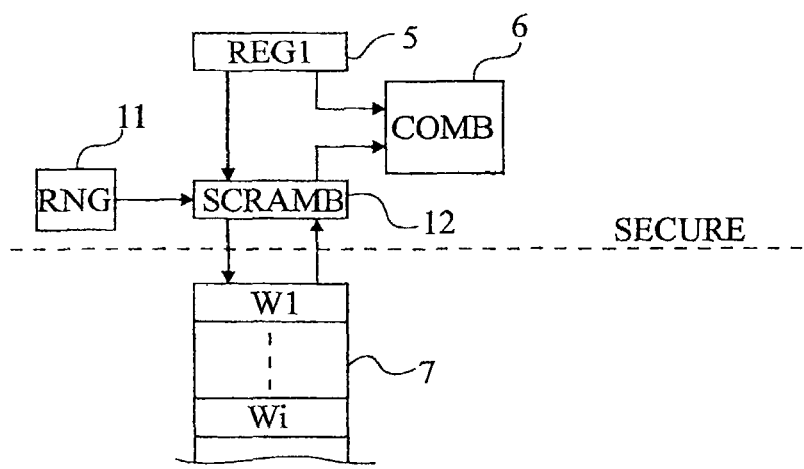
FIG. 2 illustrates an alternative of the cell of FIG. 1.

FIG. 2 illustrates an alternative of the cell shown in FIG. 1. According to this alternative, the binary word coming from the physical parameter network which is stored in register 5 is used, upon writing of the words in non-volatile memory table 7, to scramble these words. The cell thus further includes a scrambler or coder 12 (SCRAMB) to which random generator 11 as well as register 5 and combiner 6 are connected. Coder 12 is also connected to table 7.

In use, circuit 12 is used as a decoder for word Wi extracted from table 7, for said word to be used by combiner 6. The decoder is here again performed based on the word contained in register 5 and extracted from the physical parameter network.

Preferably, in the embodiment of FIG. 1, the non-volatile memory used to store table 7 is made secure like the rest of cell 1. However, in the embodiment illustrated in FIG. 2, the integration of the non-volatile memory used for the storage of table 7 in the secure area containing the rest of this cell can more easily be omitted. The alternative of FIG. 2 thus enables using an external memory (not secure). A secure area means a circuit area which is not likely to be pirated by detection of electric signals. For example, it is a cell embedded in a resin having a melting temperature greater than the circuit deterioration temperature, which prevents any analysis by electric contact.

It should be noted that the word used to scramble words Wi may, while coming from the physical parameter network, be different from the word used by combiner 6. For example, part of the word contained in register 5 may be used or another register of temporary storage of a word coming from the physical parameter network which is different from the word used by combiner 6 may be provided.

Figure 3:
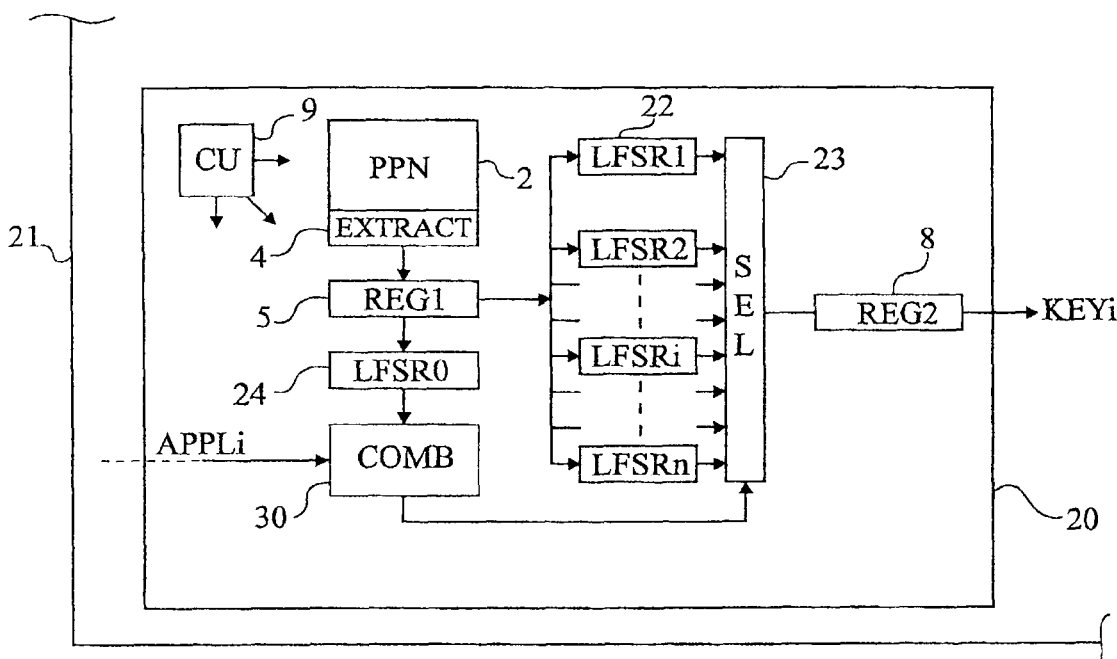
FIG. 3 very schematically shows in the form of blocks a second embodiment of a cell for generating a secret quantity depending on the application according to the present invention.

FIG. 3 very schematically shows in the form of blocks a second embodiment of a cell 20 for generating a secret quantity depending on the application in an integrated circuit chip 21. As in the first embodiment, cell 20 receives as a parameter a code APPLi representing the application program requiring key KEYi that cell 20 generates in a register 8. Similarly, cell 20 includes a physical parameter network 2 associated with an extraction circuit 4 and with a register 5, as well as a central unit 9 having the same functions as those described in relation with FIG. 1.

According to this second embodiment, the binary word extracted from the physical parameter network is used to program at least one linear feedback shift register 22 (LFSRi). In the example of FIG. 3, n registers 22 are provided, number n corresponding to the number of different quantities which are desired to be likely to be provided by means of cell 20. A selector 23 (SEL), for example, a multiplexer, receives the outputs of registers 22 and provides a digital word to register 8. Selector 23 is, for example, directly controlled by signals APPLi parameterizing cell 20 according to the concerned application. As an alternative, selector 23 may be located upstream of registers 6 rather than downstream.

Preferably, selection signal APPLi is combined (combiner 30) with a word coming from the physical parameter network. It may be all or part of register 5 or, as illustrated in FIG. 3, a word coming from an additional shift register 24 (LFSR0). Combiner 30 may be any logic gate assembly. For example, a combination of X-OR type of a word coming from register 5 or 24 and of word APPLi may be applied. Word APPLi may consists of a number of bits taken at the beginning of the application program code. By choosing a sufficient number of bits (for example, 512 or 1024), it is ensured that two applications have little risk of providing identical words APPLi.

This preferred alternative thus is a combination or a scrambling of parameterizing word APPLi by means of the physical parameter network. It may also be implemented in the embodiment of FIG. 1.

An example of application of the embodiment of FIG. 3 is the differentiation of the secret quantity coming from the physical parameter network according to applications in an Internet-type network. This type of embodiment is particularly efficient against "Trojan horse"-type attacks where a pirate attempts to extract the key by means of a fraudulent program. Indeed, the combination of word APPLi with a word coming from the physical parameter network enables differentiating the selection codes for each chip.

Figure 4:
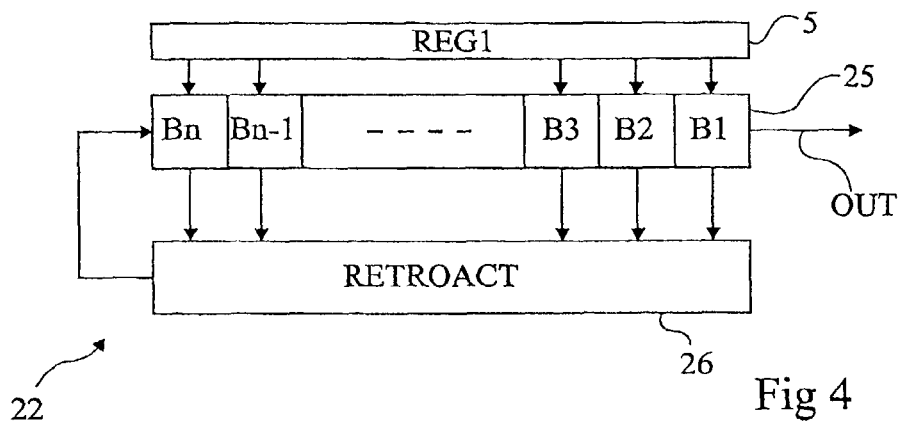
FIG. 4 shows an embodiment of a shift register of the embodiment of FIG. 3.

FIG. 4 shows in more detail a feedback shift register 22. Register 22 is formed of a shift register 25 and of a feedback function 26. Number m of bits B1, B2, B3, . . . , Bm−1, Bm of the shift register corresponds to the number of bits of the first word contained in register 5. Feedback function 26 combines several bits of register 25 to calculate the leftmost bit Bm, each time a bit is provided at output OUT of shift register 25 (assumed to go from left to right).

Preferably, the used feedback function is a linear function formed of an X-OR of several bits of the shift register. The list of bits of the shift register taken in the feedback function forms the derivation sequence of the linear feedback register or Fibonacci configuration. It may also be envisaged to use a non-linear feedback function, provided that it enables outputting a reproducible word.

In a linear feedback shift register of m bits, $2^m-1$ distinct binary sequences are available. In other words, by loading the successive bits provided on output OUT in a register of adapted size, secret quantities having sizes reaching $2^m-1$ bits may be obtained. This is the longest word before repetition. The fact of using a series unloading of the code provided by the linear feedback shift register enables lengthening the secret quantity with respect to the length of the word provided by the physical parameter network.

According to the present invention, the identifier coming from the physical parameter network is used to determine the starting word of the shift register. After, central unit 9 controls a number of register shiftings, which enables outputting the word forming the key. As for the loading of register 25, either a parallel unloading (over n bits), or a series unloading of the word may be provided. If the word is loaded in series in register 25, an input selector will simply be provided to choose between the feedback function output and the loading at the level of most significant bit Bm.

Two integrated circuit chips having different identifiers by means of their physical parameter networks will provide, with a same shift register, different quantities. Similarly, the different shift registers 22 used by the present invention in the circuit of FIG. 3 correspond to different derivation sequences which will thus provide different results for a same input word.

As an alternative, rather than using several linear feedback shift registers, a same register may be used, the derivation sequence of which is programmed according to the parameter identifying the application. It may directly be parameter APPLi or a parameter indirectly coming from this value.

According to another alternative, a single linear feedback shift register is still used and the parameter identifying the application conditions the number of shift cycles applied to register 25.

Figure 5:
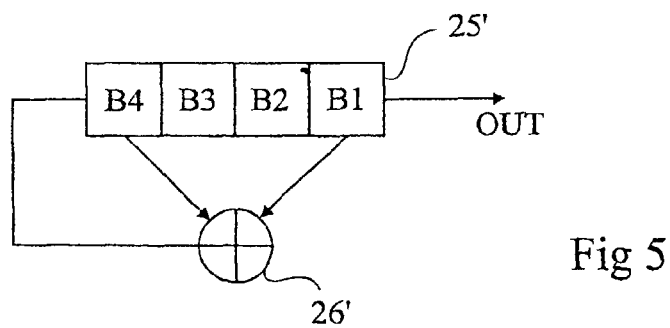
FIG. 5 shows a simplified linear feedback shift register of four bits.

FIG. 5 shows, to better understand its operation, a simplified linear feedback shift register 22 of four bits in which the derivation sequence is B1, B4. In other words, bits B1, B4, respectively the least significant bit and the most significant bit of the word contained in register 25' over four bits are combined by an X-OR type gate 26' forming the feedback function. The output of gate 26' forms the input of the shift register, and thus the input of value B4. Output sequence OUT is provided by the least significant bit (B1).

The successive contents of register 25' will be, assuming an initialization with value 1000, that is, a loading of a state 1 in bit B4 after resetting all other bits to 0:

1000; 1100; 1110; 1111; 0111; 1011; 0101; 1010; 1101; 0110; 0011; 1001; 0100; 0010; 0001, before repeating.

The choice of the derivation frequency according to the number of possible combinations before repeating is within the abilities of those skilled in the art according to the application. The realization of a linear shift register, be it in hardware or software form, is perfectly conventional. Reference may be made, for example, to work "Applied cryptography" by Bruce Schneier, published by Wiley, second edition, pages 395 to 401, which is incorporated herein by reference.

An advantage of the present invention is that it maintains the volatile (ephemeral) character of the secret quantities based on the extraction of a word coming from a physical parameter network.

Of course, the present invention is likely to have various alterations, modifications, and improvement which will readily occur to those skilled in the art. In particular, the practical implementation of the circuit which is the object of the present invention is within the abilities of those skilled in the art based on the functional indications given hereabove.

Further, although the present invention has been discussed with more specific relation to hardware elements, it may be implemented by software means, provided to keep the use of a physical parameter network of an integrated circuit chip.

Further, the respective sizes of the different digital words used are defined according to the application. On this regard, it should be noted that the implementation of the present invention requires no modification of application programs.

Finally, other functions than those discussed as an example to individualize the identifier may be used. In particular, any one-way reproducible function, as for example, so-called one-way chopping functions, may be used. "One-way" means a transformation for which the knowledge of the output word does not enable determining the input word (coming from the physical parameter network). "Reproducible" means a transformation always providing the same output word for a given input word. The different embodiments may further be combined according to the types of application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of generation of several secret quantities by an integrated circuit according to an application of these secret quantities, comprising generating, by the integrated circuit, a first digital word forming a single identifier of the integrated circuit by measuring, using a physical parameter network, a value of an electrical parameter of the integrated circuit, the measured value of the electrical parameter being sensitive to technological and manufacturing process dispersions of the integrated circuit, and converting the measured value to the first digital word, and modifying, by the integrated circuit based on an application of the integrated circuit requiring a secret quantity, the first digital word to form an individualized secret quantity required by the application, different secret quantities being generated by the integrated circuit for different applications of the integrated circuit and each of the secret quantities being derived from the physical parameter network.

2. The method of claim 1, comprising combining the first digital word with a second word coming from a non-volatile memory containing several words.

3. The method of claim 1, comprising using the word coming from the physical parameter network in a feedback shift register.

4. The method of claim 3, comprising using several feedback shift registers.

5. The method of claim 3, wherein the shift register(s) are with a linear feedback.

6. A method as defined in claim 1, wherein generating the identifier comprises generating a first digital word and supplying the first digital word to a feedback shift register.

7. A method as defined in claim 6, comprising supplying the first digital word to several feedback shift registers.

8. A cell for generating several secret quantities by a single identifier of an integrated circuit generated by a physical parameter network that measures a value of an electrical parameter of the integrated circuit, the measured value of the electrical parameter being sensitive to technological and manufacturing process dispersions of the integrated circuit, and converting the measured value to a first digital word forming the identifier, including means modifying, by the integrated circuit based on an application of the integrated circuit requiring a secret quantity, the first digital word to form an individualized secret quantity required by the application, different secret quantities being generated by the integrated circuit for different applications of the integrated circuit and each of the secret quantities being derived from the physical parameter network.

9. The cell of claim 8, including at least one feedback shift register, loaded with the first word coming from the physical parameter network, and to provide one of said secret quantities.

10. The cell of claim 8, including a combiner of the first word coming from the physical parameter network with a second digital word, extracted from a non-volatile memory and selected depending on a parameter chosen according to the desired quantity.

11. The cell of claim 10, further including a scrambler of the words contained in the non-volatile memory, based on the physical parameter network.

12. A method for generating individualized secret quantities by an integrated circuit, comprising:

generating, by the integrated circuit, a single identifier of the integrated circuit by measuring, using a physical parameter network, an analog value of an electrical parameter of the integrated circuit, the measured value of the electrical parameter being sensitive to technological and manufacturing process dispersions of the integrated circuit, and converting the measured analog value to the single identifier, the identifier forming a signature of the integrated circuit; and modifying, by the integrated circuit, the identifier based on an application of the integrated circuit requiring a secret quantity to form an individualized secret quantity, such that different secret quantities are generated by the integrated circuit for different applications of the integrated circuit and each of the secret quantities is derived from the physical parameter network.

13. A method as defined in claim 12, wherein generating the identifier comprises generating a first digital word and wherein modifying the identifier comprises combining the first digital word with a second digital word from a nonvolatile memory containing several words.

14. A cell on an integrated circuit that operates according to the method of claim 12.

15. A cell as defined in claim 14, wherein the identifier is represented as a first digital word, further including at least one feedback shift register that is loaded with the first digital word derived from the physical parameter network and that provides the secret quantity.

16. A cell as defined in claim 14, wherein the identifier is represented as a first digital word, further including a combiner to combine the first digital word with a second digital word from a nonvolatile memory and selected according to the application.

17. A cell as defined in claim 16, further including a scrambler to scramble the words in the nonvolatile memory based on the identifier.

18. A method as defined in claim 12, wherein modifying comprises selecting a second digital word from a plurality of digital words stored in the integrated circuit and associated with respective applications of the integrated circuit, and combining the selected second digital word with the first digital word to form the secret quantity required by the application.

19. A method as defined in claim 12, wherein modifying comprises supplying the first digital word to a plurality of linear feedback shift registers, and selecting an output of one of the linear feedback shift registers, based on a signal representative of the application, to provide the secret quantity required by the application.

* * * * *